June 8, 1965  A. BOSMAN  3,187,866

TRANSVERSELY ENGAGED, INTERIOR AND EXTERIOR SHAFT COUPLING

Filed Dec. 4, 1962

INVENTOR.
ARNOLDUS BOSMAN
BY
Francis W. Young
ATTORNEY

United States Patent Office 3,187,866
Patented June 8, 1965

3,187,866
TRANSVERSELY ENGAGED, INTERIOR AND EXTERIOR SHAFT COUPLING
Arnoldus Bosman, Arnhem, Netherlands, assignor to American Enka Corporation, Enka, N.C., a corporation of Delaware
Filed Dec. 4, 1962, Ser. No. 242,252
Claims priority, application Netherlands, Dec. 13, 1961, 272,504
5 Claims. (Cl. 192—72)

This invention relates generally to an automatic or self actuating coupling member for connecting a driven shaft to a drive shaft, and more particularly to a coupling of the rolling key type for clutching a hollow drive shaft to a driven shaft coaxially supported within the hollow shaft.

Shaft couplings of the type to be described herein are generally known to this art and have been used heretofore for permitting disengageable connections between two rotatably supported elements. While the two shafts to be coupled are shown and described herein as being concentrically mounted, this arrangement is not absolutely essential and with minor modifications the coupling arrangement of the present invention could be utilized for quick detachably connecting ends of parallel shafts terminating one adjacent the other. These shaft couplings have been used heretofore for coupling slowly rotating shafts which must be rapidly disconnected, and are generally connected for rotation with the driven shaft and for non-rotation upon disconnection of that shaft from the drive element.

Shaft couplings described herein have a variety of end uses, but are particularly adaptable for connecting gear wheel type spinning pumps forming part of an assembly necessary for the melt extrusion of synthetic yarns and threads. When using known type couplings in melt spinning, care must be taken to prevent overriding of the drive shaft by the driven shaft. Such overriding generally occurs when pressure on the inlet side of gear type metering pumps exceeds the normal range, resulting in drive of the gear pump by the melt being metered. For this reason, overriding or free wheeling couplings are unsatisfactory.

Concomitant with the undesirable overriding feature, known type couplings generally operate effectively in one direction of rotation only, and thereby are not sufficiently versatile for use in the melt spinning of synthetics. Ratchet and pawl type couplings, therefore, are not useful for purposes of this invention. Although double acting ratchet and pawl type couplings are available for transmitting motion in either direction of rotation, the same require an excess amount of space and also necessitate separate latching mechanisms for each of the two drives.

Another disadvantage to known shaft couplings is that when engaged, the two shafts are rigidly connected one to the other and any sudden obstacle to rotation of the driven shaft more than likely would produce breakage in the coupling element. Sudden locking of the driven shaft for various reasons, such as clogging of metering pumps, is so prevalent that some shaft couplings are specifically designed with a shear pin or overload protective device which breaks in order to prevent further equipment damage. It will be apparent that such protective devices must be replaced prior to resumption of operations and that replacement requires extended expense and down time of equipment.

In addition to the foregoing disadvantages, conventional means for coupling one shaft to another heretofore have required fast rotation of the coupling member relative to the drive shaft in order to effectuate proper engagement or disengagement of elements. Such fast rotation, which must be accomplished manually with known equipment, is extremely difficult to perform, particularly if the drive shaft rotates at a fast rate of speed.

A primary object of the present invention, therefore, is to provide a shaft coupling member not having the disadvantages enumerated hereinabove.

Another object of this invention is to provide a shaft coupling operable in either direction of shaft rotation.

A further object of the present invention is to provide a shaft coupling having a resettable overload protective feature.

Still another object of this invention is to provide a shaft coupling apparatus which may be disengaged simply by interrupting rotation of the coupling member but which is automatically re-engaged upon release of the coupling member.

Another object of the present invention is to provide a coupling apparatus which requires no special skill for operation.

An additional object of this invention is to provide a single coupling apparatus for positively connecting one shaft to another shaft regardless of direction of shaft rotation and while preventing shaft override, but which may be quickly disengaged, automatically re-engaged, and which is provided with resettable overload protection.

These objects may be accomplished in accordance with the present invention by positively connecting a drive ring to a drive shaft, by positively but releasably connecting a driven ring to a driven shaft, by providing a pawl type clutch element pivotally mounted between an operable position engaging the drive ring and an inoperable position sliding freely within the drive ring, and by spring urging the clutch element into operative position. For ease of operation, the pivotally supported clutch element may be connected to an exposed hub member and, although it normally rotates with the drive shaft, it may be restrained against rotation in order to pivot the clutch member into inoperative position. Upon release of the hub member, the clutch element, which is normally urged into operative position, will pivot into engagement with the drive ring and initiate rotation of the driven shaft.

These and other objects will become apparent to those skilled in this art upon study of the following detailed discussion taken in conjunction with the accompanying drawings wherein.

Figure 1:
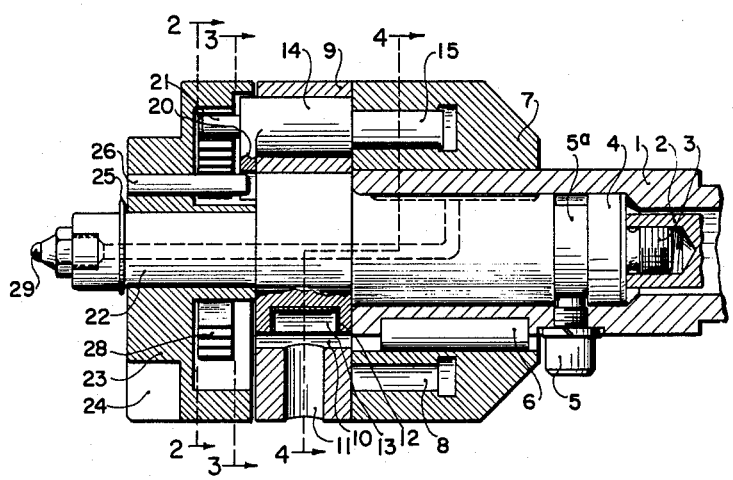
FIGURE 1 is a longitudinal view in cross section illustrating a preferred form of this invention.

With attention now directed to the drawings wherein like reference numerals represent like parts throughout, construction and operation of this invention will be explained. Hollow shaft 1 in FIGURE 1 is utilized in this preferred embodiment as the drive shaft and concentrically mounted inner shaft 2 of the same FIGURE 1 as the driven shaft. As explained earlier, however, inner shaft 2 could impart rotation to hollow shaft 1 through the coupling apparatus to be described and the inner shaft 2 could extend outwardly from rather than within the shaft 1. Any conventional prime mover, not shown, of course could be connected to these shafts.

The terminal end of shaft 2 shown in FIGURE 1 is screw coupled at 3 to a shaft stub 4. In view of the positive but removable connection 3, any rotation imparted to shaft stub 4 will necessarily be transmitted to inner shaft 2. In order to preserve longitudinal alignment between shafts, a locking pin 5 is secured to outer shaft 1 and projects inwardly to engage with a circumferential groove 5a in shaft stub 4. Although these shafts are thereby locked against relative longitudinal movement, pin 5 permits rotation of either shaft relative to the other.

A conventional key 6 is inserted in an unidentified keyway of shaft 1 and in an axial groove in a drive ring 7, thereby locking the latter for rotation with outer shaft 1. For purposes to appear presently, drive ring 7 is provided with an annular groove 8 opening toward the end of the shafts to be coupled.

Figure 4:
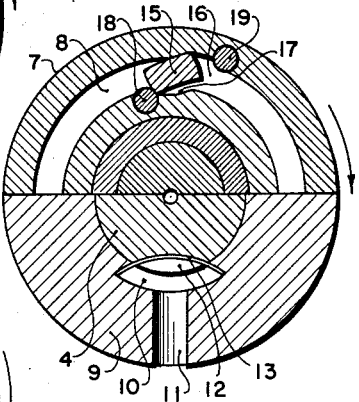
FIGURE 4 is a cross sectional view taken along the broken line 4—4 of FIGURE 1 showing in the lower portion thereof the overload protective feature of this invention and in the upper portion thereof operation of the clutching element per se.

A driven ring 9 is releasably locked to the stub portion 4 of inner shaft 2, as will be seen from FIGURES 1 and 4 of the drawings. To effectuate a releasable and resettable latch between driven ring 9 and shaft stub 4, a recess 10 is formed in driven ring 9 and a cooperating recess 12 is formed in stub 4. These recesses are formed arcuately to receive flat leaf spring 13 under tension either in the engaged position of FIGURE 4, wherein said spring is urged against stub 4, or in a disengaged position urged against recess 10 of driven ring 9. Upon introduction of excess strain between stub 4 and ring 9, the leaf spring 13 will yield to permit relative rotation and eventually will snap to an inoperative position opposite that shown in FIGURE 4. The strain required to produce this movement will depend of course upon the strength chosen for the leaf spring. When the cause for overload has been determined and corrected, leaf spring 13 may easily be reactivated by force with any suitable tool inserted through radial opening 11, which communicates with recess 10. Compare FIGURES 1 and 4. It will be seen therefore that leaf spring 13 together with these recesses affords within limitations a positive engagement which yields only upon application of excess force and that this overload device may easily be reset to restore the coupling apparatus to normal operation.

Driven ring 9 also supports the quick detachable coupling apparatus described briefly hereinabove. This coupling apparatus comprises a cylindrical portion or journal 14 and a flattened clutch element 15, see FIGURES 1 and 4. Clutch element 15 is flattened and has opposed concentric surfaces corresponding in curvature to annular groove 8. Accordingly, this clutch element may rotate within and relative to groove 8 but may be tilted to the FIGURE 4 position and wedged within enlarged recesses 16 and 17 of the annular groove. In this wedged position, any rotation imparted to drive ring 7 will necessarily be transmitted through clutch element 15 to the journal 14 and driven ring 9.

In order to avoid undesirable excessive wear on the enlarged portions of annular groove 8, cylindrical pins 18 and 19 of wear resistant material, such as hardened steel, are provided. These pins are radially and circumferentially displaced within the annular groove portions of drive ring 7 to permit passage of clutch 15 when the clutch is rotated to a non-illustrated concentric relationship with the groove but to engage the same along a generatrix and thereby transmit force when the clutch element is skewed as shown in FIGURE 4. The size of clutch element 15 should be so selected as to provide slight tangential movement within the recessed portions 16, 17 of groove 8. With such movement, coupling may be effected, notwithstanding the direction of shaft rotation.

A forked lever 20 is formed integral with journal 14 opposite the clutch element 15 as shown in FIGURE 1, and an axial pin 21 extends outwardly from this same end. The forked lever and pin overlie a necked-down or reduced end 22 of shaft stub 4 and are enclosed by hub 23 which is rotatably supported on shaft portion 22. A wing nut 24 is formed integral with hub 23 for purposes to appear and the hub 23 is secured against axial displacement on shaft portion 22 by retaining ring 25 of conventional design.

Figure 2:
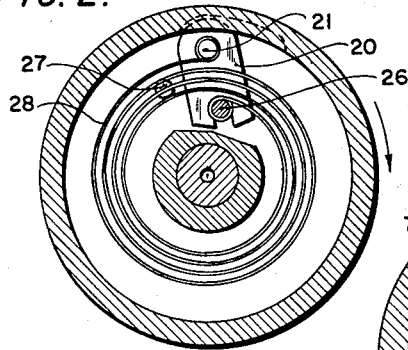
FIGURE 2 is a sectional view taken along line 2—2 of FIGURE 1 showing a portion of the coupling member in engaged position.
Figure 3:
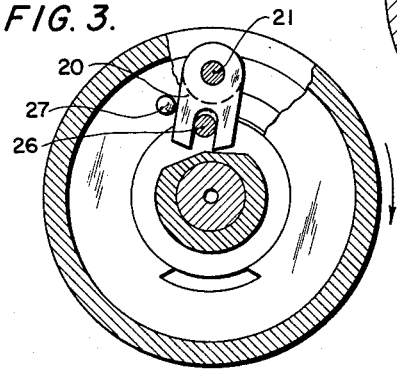
FIGURE 3 is a sectional view taken along line 3—3 of FIGURE 1 showing a portion of the coupling member in disengaged position.

Lever 20 projects radially inwardly of driven ring 9 and the forked end thereof overlies or straddles a pin 26 secured to hub 23 and extending parallel to the axis thereof. Rotation of hub 23 relative to driven ring 9, therefore, operates through pin 26 and forked lever 20 to pivot journal 14 and clutch element 15 relative to the drive and driven rings 7, 9, respectively. Rotation of clutch element 15 into operative position is limited by engagement between curved faces of the clutch and recesses 16, 17 of annular groove 8, while rotation in the opposite or disengaged position is limited by an abutment pin 27 supported by driven ring 9. See FIGURES 2 and 3.

The clutch element and journal are normally urged into engaged position by a watch type spring 28 mounted concentrically within the interior of hub 23. One end of spring 28 is attached to pin 21 of the coupling assembly and the opposite end is fixed to hub 23 by attachment onto pin 26. Spring 28 is mounted under initial tension tending to urge hub 23 in a clockwise direction when viewed from the left end of FIGURE 1 relative to driven ring 9. Such movement results in pivoting of forked lever 20 to the FIGURE 2 position which tilts clutch element 15 into recesses 16, 17 of the annular groove 8. Should hub 23 be released while clutch element 15 and groove 8 are in relative positions different from that shown in FIGURE 4, it will be apparent that clutching cannot occur and that continued relative rotation between the shafts 1 and 2 will be necessary until the clutch element enters the enlarged area produced by recesses 16 and 17. Since spring element 28 continually urges clutch element 15 into the skewed position of FIGURE 4, engagement will automatically occur when the clutch element is rotated to the enlarged portions of the annular groove.

From the foregoing description, it will be seen that leaf spring 13 yieldably connects drive ring 9 to shaft stub 4 and the key 6 connects drive ring 7 to shaft 1. Rings 7 and 9 are quick-releasably coupled one to the other by journal 14 and clutch element 15. During operation of this device, and assuming that outer shaft 1 drives inner shaft 2, both shafts, drive ring 7, driven ring 9, and hub portion 23 rotate. Should it be desired to discontinue rotation of inner shaft 2, one need only arrest hub 23 against rotation. This may be accomplished by manually grasping the hub or by sliding a stationarily mounted locking pin into the path of wing nut 24. As soon as rotation of the hub is arrested, driven ring 9 will rotate relative thereto. Since pin 26 is fixed to hub 23, continued rotation of driven ring 9 will shift forked lever 20 from the FIGURE 2 position to that shown in FIGURE 3, which necessarily pivots clutch element 15 from the engaged position of FIGURE 4 into alignment with annular groove 8. The clutch element and groove 8 become aligned approximately at the point of engagement between forked lever 20 and abutment pin or stop 27, and the drive ring 7 may continue rotating despite the fact that rotation of the driven ring and hub has been arrested. Upon release of wing nut 24 and/or hub 23 for rotation, spring 28 immediately produces relative movement between the hub member and driven ring. When viewed from the left end of FIGURE 1, hub 23 will turn in a clockwise direction or, conversely, driven ring 9 will turn in a counter-clockwise direction. In either event, however, pin 26 causes pivoting of lever 20 and clutch element 15 into the clutched position.

For lubrication purposes, a nipple 29 is mounted in the end of shaft portion 22 and this shaft portion together with the remainder of shaft stub 4 is bored to permit passage of lubricant in a conventional manner. It is preferred and recommended that a lubricant formed from molybdenum disulfide be packed within annular groove 8 to permit suitable sliding action when the coupling apparatus is disconnected.

As indicated earlier, the shaft coupling described could be utilized for connecting overlying or concentrically disposed shafts such as illustrated, as well as unsupported ends of shafts extending one toward the other. Modification to perform the latter of course would require removal of nipple 29 and possible relocation of wing nut 24. Moreover, the clutching element 15 has been found effective for transmitting motion in either direction, that is, from ring 7 to ring 9, or conversely. The overload device 13 is mounted symmetrically relative to a radius of the assembly, and of course would operate in either direction of shaft rotation. In the described embodiment, any tendency of inner shaft 2 to override or lead shaft 1 would be prevented by engagement between clutch element 15 and hardened steel pin 19. Overriding in the opposite direction which might occur when driving from inner shaft 2 would be prevented by engagement between the clutch element and hardened steel pin 18.

Inasmuch as other modifications and alternatives will become apparent to those skilled in this art, it is intended that the present invention be limited only to the extent set forth in the following claims.

What is claimed is:

1. A coupling assembly for connecting a first shaft to a coaxial second shaft, said assembly comprising a drive ring secured to said first shaft for rotation therewith, means defining an annular groove in one face of said drive ring, a driven ring releasably connected to said second shaft for rotation therewith adjacent the annular groove in said drive ring, a clutch element pivotally supported by said driven ring and projecting into the annular groove of said drive ring, means rotatable with said driven ring for normally urging said clutch element into skewed position relative to said annular groove to effectuate locking engagement between the drive and driven rings, and means defining an enlargement of said annular groove to provide lost motion between the same and the clutch element prior to engagement for expediting coupling.

2. A coupling assembly as set forth in claim 1 and additionally comprising pins of wear resistant material positioned in the enlargement of said annular groove to engage said clutch element.

3. A coupling assembly for connecting a first shaft to a coaxial second shaft, said assembly comprising a drive ring secured to said first shaft for rotation therewith, means defining an annular groove in one face of said drive ring, a driven ring, a leaf spring normally urged into engagement with recesses in both said driven ring and said second shaft but yieldable to snap into unlocked condition out of engagement with said second shaft for releasably connecting the driven ring and second shaft, a clutch element pivotally supported by said driven ring and projecting into the annular groove of said drive ring, and means rotatable with said driven ring for normally urging said clutch element into skewed position relative to said annular groove to effectuate locking engagement between the drive and driven rings.

4. A coupling assembly as set forth in claim 3 and further comprising means defining an access opening in said driven ring communicating with the recess in said driven ring through which said leaf spring may be reset into locked condition.

5. An assembly comprising a hollow outer shaft, an inner shaft supported for relative rotation within said hollow shaft but having one end protruding therefrom, a first ring secured to said hollow shaft, means defining an annular groove in said first ring, said annular groove opening toward the protruding end of said inner shaft, a second ring releasably secured to the protruding end of said inner shaft alongside the annular groove in said first ring, a coupling having a journal portion, a clutch element, an axial pin and a forked lever pivotally supported by said second ring, said clutch element extending into the annular groove of said first ring for cooperation therewith in transmitting motion from one ring to another, said forked lever extending radially inwardly on the opposite side of said second ring from said clutch element, a hub rotatably supported by the protruding end of said inner shaft and enclosing the forked lever and axial pin of said coupling, a hub pin supported by said hub and projecting into said forked lever to transmit motion from the hub to the lever, spring means secured to said hub and to said axial pin, said spring means being tensioned to urge the hub and coupling into such position as to engage the clutch element with said annular groove to connect said first and second rings for simultaneous rotary movement, and means for imparting rotation to one of said shafts.

References Cited by the Examiner

UNITED STATES PATENTS

| 44,448 | 9/64 | Olmsted | 192—72 |
| 1,383,813 | 7/21 | Jacobi | 192—72 |

FOREIGN PATENTS

| 815,937 | 4/37 | France. |
| 578,613 | 6/33 | Germany. |
| 22,170 | 10/07 | Great Britain. |

DAVID J. WILLIAMOWSKY, *Primary Examiner.*